June 6, 1944.  J. F. MERCER  2,350,913
MOTOR LOAD CONTROL
Filed Aug. 12, 1941
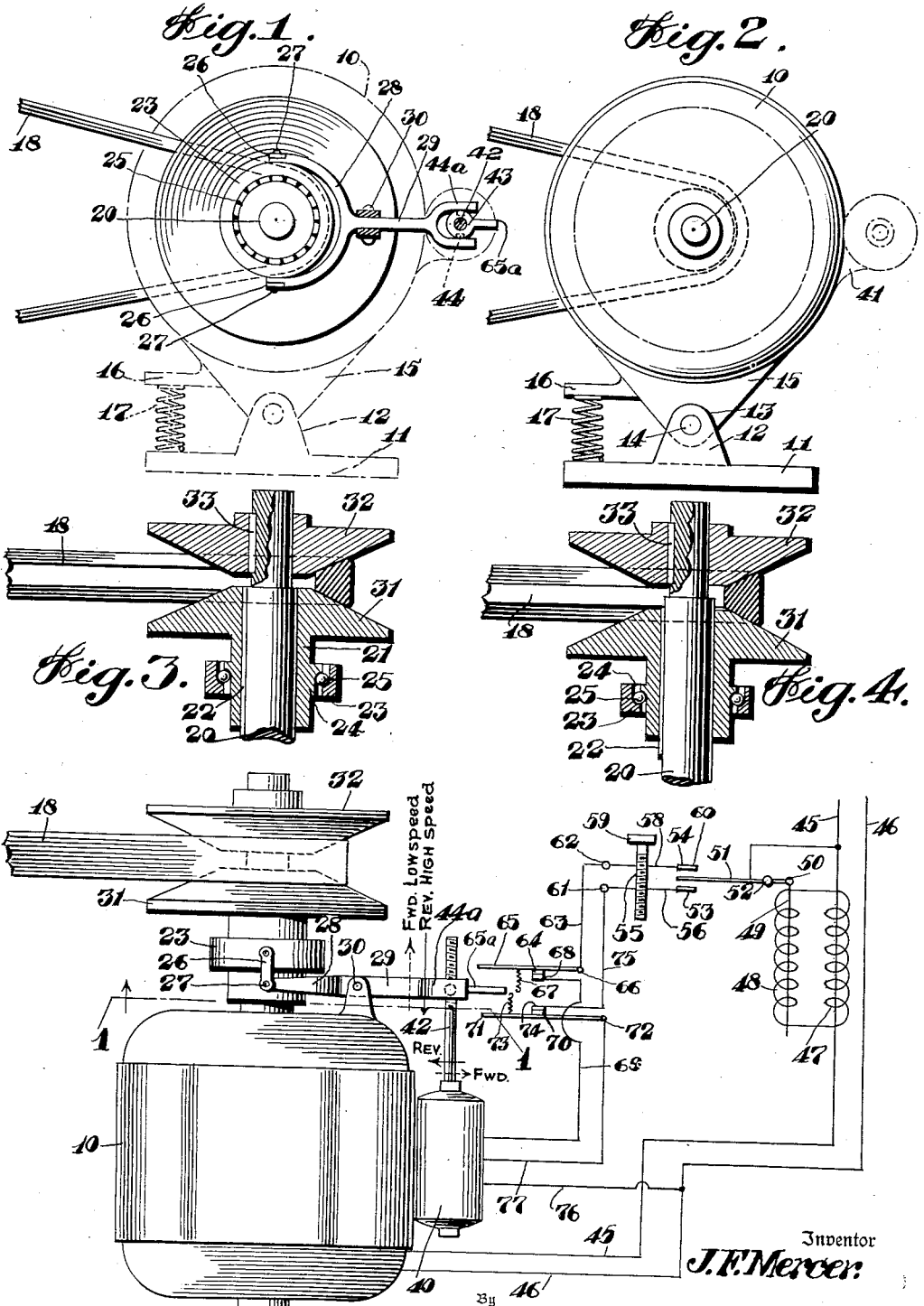
Inventor
J. F. Mercer
By Mann, Anderson & Liddy
Attorneys Patented June 6, 1944

2,350,913

UNITED STATES PATENT OFFICE 2,350,913

MOTOR LOAD CONTROL

John F. Mercer, Globe, Ariz.

Application August 12, 1941, Serial No. 406,567

3 Claims. (Cl. 172—239)

This invention relates to a device for maintaining a constant load on a motor.

In refrigerating machines at present electric motors must be designed large enough to start and operate the compressor when the evaporator is warm and the back pressure is at its highest peak. During the operation of the machine the evaporator starts cooling thereby gradually reducing the back pressure and causing the machine to pump less and less gas as the operation continues. The head pressure at this time drops proportionately. Finally when a desired evaporator temperature is maintained, the motor will be running at a very light load and thus will be very low in efficiency. However, the larger motor construction adds to the cost of the refrigerator and more current is used when the motor is started after an idle period.

It is an object of the present invention to provide a mechanism between an electric motor of small proportions and a compressor for varying the speed of the compressor while maintaining the load on the motor substantially constant during the various stages of the compressing period, means being included in the mechanism for causing the compressor to be actuated in accordance with the current required to operate the motor at a particular time.

A further object of the invention is the provision of a device for maintaining the load on a motor which operates a compressor in a refrigerating machine constant over the entire period of operation of the motor, means being employed for increasing or decreasing the speed of the compressor in such a manner that as the current drops in the motor circuit the compressor will automatically run faster proportionately and vice versa.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a transverse vertical section taken along the line I—I of Fig. 5.

Figure 2 is a fragmentary end view of an electric motor and its support.

Figure 3 is a horizontal section showing the sections of a pulley associated in close formation.

Figure 4 is a similar horizontal section showing the sections of a pulley in greater spaced relation.

Figure 5 is a plan view of an apparatus for maintaining a constant load on an electric motor.

Referring more particularly to the drawing, 10 designates an electric motor which is adapted to drive a compressor of a refrigerating machine, or which may be adapted to drive other mechanism. This motor is pivotally mounted on a base member 11 by means of ears 12 rising from the base member and is provided with bearings 13 to receive a rod 14 which is carried by projections 15 depending from the bottom of the motor 10.

A lip 16 projects laterally from the lower portion of the motor 10 and is engaged by a spring 17 which is mounted on the base member 11. Thus, it will be seen that when a pull is exerted on the motor by a belt 18 the spring 17 will resist the tilting movement of the motor to the left as shown in Fig. 2 and thus the spring acting against the lip 16 will tend to maintain the belt 18 taut.

In place of the lip 16 and the spring 17 the motor may be mounted on a base member which is hinged at one end and tilted so that the weight of the motor will act against the belt 18. The construction just described has not been illustrated because it is a well known form of belt tightener.

A shaft 20, which is directly connected with the electric motor 10, extends beyond one end of the motor and has a sleeve 21 slidably mounted thereon adjacent to the motor. A key 22 permits the sleeve to be moved longitudinally of the shaft but causes the sleeve to be rotated with the shaft.

A collar 23 is rotatably mounted upon an annular shoulder 24 formed integrally with the sleeve 21. The numeral 25 constitutes not only a bearing for the collar 23, but a thrust bearing for the sleeve 21 and is located between the annular shoulder 24 formed on the sleeve 21 and the collar 23. The collar 23 at diametrically opposite points carries links 26 which are pivotally connected at 27 with the arms of a fork 28.

An operating arm 29, pivoted at 30, is connected with the fork 28 so that when the arm is oscillated the fork will be oscillated and the sleeve 21 will be shifted towards or away from the motor 10 for a purpose which will be presently explained.

One section 31 of a V pulley is formed integrally with the sleeve 21. The other section 32 of the pulley is secured at 33 to the outer end of the shaft 20. The section 32 is revolved with the shaft 20 as is the section 31, but the section 32 remains stationary with respect to the longitudinal axis of the shaft.

The belt 18 which conforms in cross sectional area to the groove formed between the sections 31 and 32 of the pulley is directed to a point where it engages the groove of a pulley that operates a compressor or other working element. The compressor or other working element is not shown.

A reversing motor 40 is carried by brackets 41 projecting from the housing of the motor 10. The motor shaft which projects beyond the motor 40 is provided with threads 42 which mesh with the internal threads of a collar or nut 43. This collar, shown in Fig. 1, is swivelly mounted as shown at 44 in a yoke 44ª connected to the outer end of the lever or arm 29. The rotation of the shaft 42 in one direction by the motor 40 causes the arm 29 to be rocked in one direction, while the reverse rotation of the shaft causes the arm or lever to be moved in the opposite direction as will be presently explained.

Wires 45 and 46 are connected with the house current and are also connected with the motor 10. The wire 45 passing through coil 47 comprises the current transformer. The coil 47 is connected to a secondary coil 48. The coil 48 and a core 49 constitute a relay. The current in these coils will be equal and proportional to the current passing through wire 45.

The movable core 49 is pivotally connected at 50 with a pivotally mounted switch arm 51. This switch arm is adapted to be oscillated on its pivot 52 for engaging either a contact member 53 or a contact member 54 depending upon the current passing through the wire 45 and through the coil 47.

A screw 55, having left and right hand threads has threaded connection with the arms 56 and 58 carrying the respective contacts 53 and 54 so that when the screw is rotated by the thumb-piece 59 the arms 56 and 58, and likewise the respective contacts 53 and 54 will be moved towards or away from each other for properly adjusting the contacts with respect to the free end 60 of the switch arm 51. The arms 56 and 58 are respectively pivoted at 61 and 62.

A wire 63 connects the arm 58 with a movable contact 64 carried by an arm 65 pivoted at 66. A spring 67 tends to return the arm 65 to its normal horizontal position when the said arm has moved the contact 64 away from the stationary contact 68. The last-mentioned contact is connected by a wire 69 to the motor 40.

A movable contact 70 is carried by an arm 71 which is pivoted at 72. This arm is normally maintained in a horizontal position by a spring 73 so that the contact 70 will engage a stationary contact 74 connected by a wire 75 with the arm 56.

A wire 76 connects the wire 46 with the reversing field of the motor 40 and the wire 77 connects the reversing field with the arm 71 and, therefore, with the contact 70.

The operation of my device is as follows: When the motor 10 is operating under a normal load for operating the compressor or other instrumentality the parts will be in the position shown in Fig. 5. However, when the load is increased on the motor 10, a greater amount of current will be drawn through the wire 45 and the coil 48, and thus increase the pull of the coil 47, so that the member 49 will be operated and rock the switch arm 60 to a position where it will engage the contact 54. The current at this time from the wire 45 will pass through the arm 51, the wire 63, the movable contact 65, the stationary contact 67 and the wire 69 to the motor 40. The return circuit is made through the wire 76 and the wire 46. The screw 42 will be revolved by the motor 40 and cause the threaded nut 43 to be moved towards the contact 65 until the finger 65a connected with the nut 43 engages the contact 65 and moves it away from the contact 68 thereby breaking the circuit to the motor 40.

The members 65, 67, 71 and 74 constitute a limit switch which controls the operation of the motor 40 and stops said motor after the lever 29 has been rocked sufficiently to move the slidable section 31 of the pulley to its inner or outer limits. The stopping of the motor prevents the screw 42 from causing the lever 29 and the movable section 31 from over-running its limits of operation.

When the current is passing through the wire 63, contacts 64, 67 and the wire 69 the movable section 31 of the pulley will be moved towards the motor 10 whereby the load and the compressor will be actuated at a slower speed.

On the other hand when the current falls in the primary coil 47 the member 49 will be moved outwardly from the secondary coil 48 and cause the arm 51 to be rocked towards the contact 53 until it engages said contact. At this time current from the wire 45 will pass through the wire 75, contacts 74, 70 and wire 77 to the motor 40 whereby said motor will be directly operated so that the screw 42 will move the nut 43 towards the motor 40 while the slidable section 31 of the pulley will be moved towards the section 32. As the section 31 moves towards the section 32 the diameter of the pulley will be increased and, therefore, the compressor will be driven at a greater speed.

When the section 31 is moved towards the section 32 the finger 65a will move towards the movable contact member 71 and when it engages said contact member it will move it outwardly whereby the contact 70 will be moved away from the contact 74 and thus break the circuit to the motor 40.

It will be seen by this construction that as the current drops from the motor circuit it will automatically cause the compressor to be run faster and thus make the motor pull at its highest efficiency throughout the entire load, and, therefore, the load can be kept approximately constant over the entire period of the operation.

The hinging of the motor 10 in connection with the lip 16 and spring 17 will permit the motor 10 to adjust itself when the pulley represented by the sections 31 and 32 present a larger or smaller diameter to the belt 18.

It will be noted at all times that when the current in the circuit of the motor 10 increases, it will cause the contact arm 51 to move against the contact wire to cause the small motor 40 to run in its normal direct rotation, while the reversing of the motor caused by the decreasing current in the primary coil 47 will cause the arm 29 to be rocked in a direction whereby the section 31 of the pulley will be moved toward the section 32 of the pulley, thus increasing the speed of the compressor.

While a refrigerating machine has been referred to in the specification and in the claims, it is to be understood that this device is not limited to a refrigerating machine or air conditioning apparatus, since it can be employed in any apparatus where it is desired to maintain a constant load on an electric motor due to varying operating conditions required by the work.

I claim:

1. In an apparatus of the character described, a driven element, an electric motor for operating the driven element, means for maintaining the load on the motor substantially constant at all times comprising a mechanical transmission between the motor and the driven element, a circuit supplying current to the motor, means operating the transmission for causing an increase or decrease of the speed of said driven element, a reversible motor actuating the operating means, a circuit branching from the first circuit for supplying current to the reversible motor for causing said motor to operate in one direction, a wire connected between the branch circuit and the reversing field of the second motor, a two-way switch actuated by the reversible motor for alternately opening or closing the circuits to the reversible motor, and means operated in accordance with current supplied to the first motor for controlling the supply of current through the two-way switch to the second motor.

2. In an apparatus of the character described, a driven element, an electric motor for operating the driven element, means for maintaining the load on the motor substantially constant at all times comprising a mechanical transmission between the motor and the driven element, means adjusting the transmission for varying the speed of the driven element and including a reversible motor, a plurality of circuits, one of the circuits controlling direct operation of the first motor, a second circuit controlling direct operation of the second motor and a third circuit controlling reverse rotation of the second motor, a switch operated by the second motor for limiting the time of rotation by opening the second and third circuits alternately, a second switch cooperating with the first switch for alternately closing the second and third circuits, and means operated in accordance with fluctuations in the circuit to the first motor for controlling operation of the second switch.

3. In an apparatus of the character described, a driven element, an electric motor for operating the driven element, means for maintaining the load on the motor substantially constant at all times comprising a mechanical transmission between the motor and the driven element, a reversible motor, means between said motor and transmission and actuated by the reversible motor for operating the transmission, a limit switch for controlling the operation of the reversible motor in either direction of rotation, a two-way switch controlling the flow of current for direct operation of the reversible motor and for the reverse rotation of said motor, and a magnetic means influenced by fluctuation in the current to the first motor for alternately operating the two-way switch.

JOHN F. MERCER.